Inventors
John G. Mitchell
William A. Stover

United States Patent Office 3,382,189
Patented May 7, 1968

3,382,189
HEAT TREATING OF POWDERED PARTICLE MATERIAL
John G. Mitchell, Larchmont, N.Y., and William A. Stover, Pitman, N.J., assignors to Mobil Oil Corporation, a corporation of New York
Filed Aug. 10, 1964, Ser. No. 388,597
6 Claims. (Cl. 252—455)

ABSTRACT OF THE DISCLOSURE

Catalyst particles of fluidizable particle size are tempered when in shallow dense fluid bed conditions and heated indirectly in moisture-free atmosphere and then in oxygen-free steam to 1200–1400° F. for 1–4 hours, and then heat soaked at 1200–1500° F. for 1–24 hours.

Figure 1:
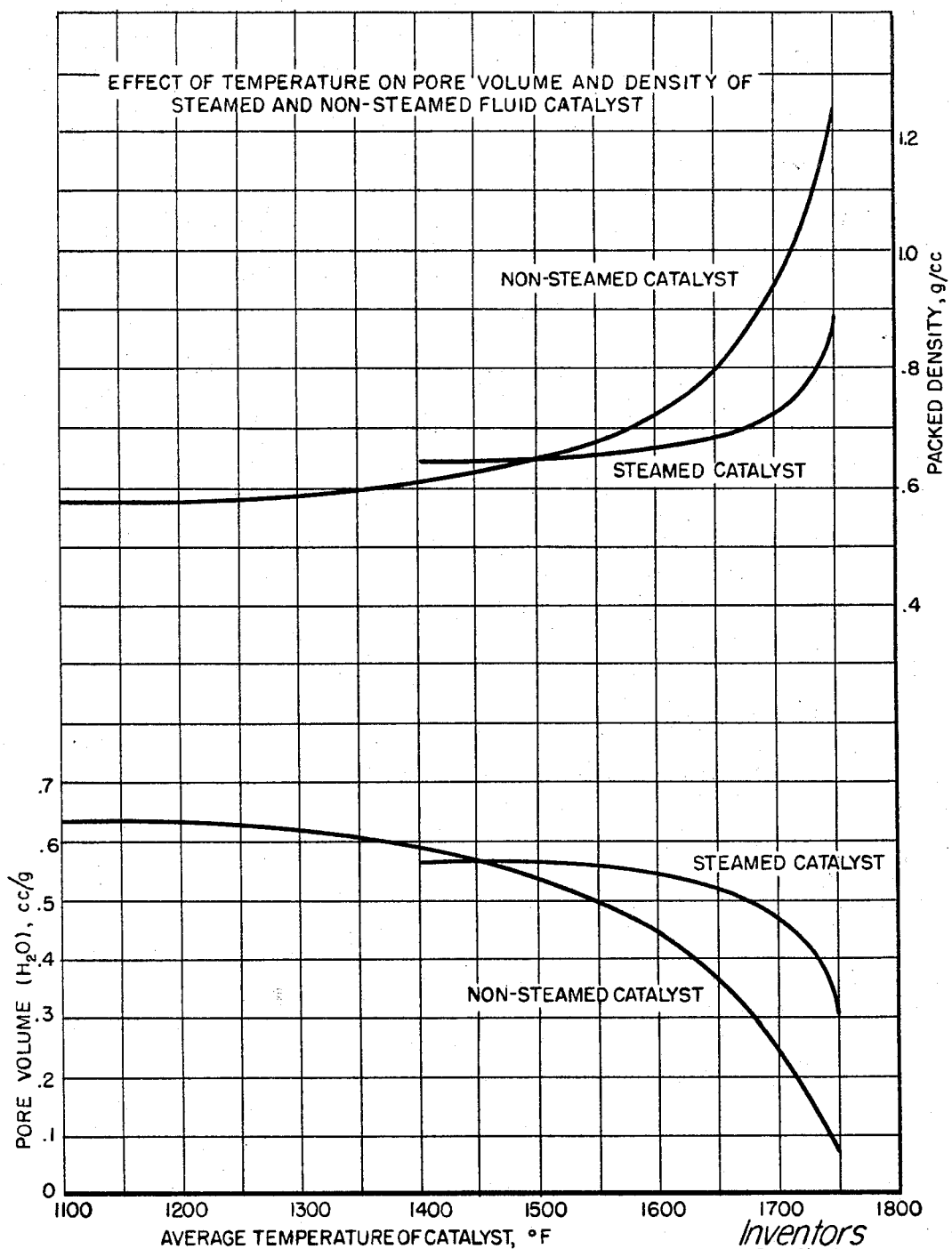

This invention relates to the method and means for tempering catalyst particles. In a more particular aspect, the present invention relates to the method and means for improving the stability of silica-alumina containing catalyst particles against thermal and non-hydrocarbon chemical deactivation.

Since the beginning of catalytic cracking, it has been known that cracking catalysts loose their activity through use. It has also been found that the catalyst deactivation is of a permanent or temporary nature which can be controlled depending on the method of catalyst preparation and conditions employed. Accordingly, the prior art has taught that steam can cause permanent deactivation of a silica-alumina catalyst and aging of a silica-alumina catalyst with steam can be used to control catalyst surface area and pore volume. A recent article in the Journal of Physical Chemistry, volume 61, June 1957, page 714, entitled, "Aging of Silica-Alumina Cracking Catalyst I Kinetics of Structural Changes by Heat and Steam," is of particular interest. This article teaches that steam tempering produces a catalyst with a higher pore volume for a given surface area than would be achieved by tempering in dry air. However, the article fails to recognize, teach or suggest the invention herein described that a steam tempered catalyst is more resistant to physical changes upon subsequent severe thermal treatment.

It is an object of this invention to temper catalyst particles of a fluidizable particle size.

It is a further object of this invention to improve the catalytic selectivity of a silica-alumina containing catalyst.

A further object of this invention is to improve the stability of a silica-alumina containing catalyst against the deactivating influences of temperature.

A further object of this invention is to improve the thermal stability of silica-alumina containing catalysts by a method of steam tempering.

A still further object of this invention is to provide the means for fulfilling the objects presented above.

Other objects and advantages of this invention will become more apparent from the following discussion.

The present invention relates to the method and means for effecting tempering of catalyst particles containing silica and alumina to produce catalyst particles of improved stability and desired catalyst selectivity. That is, it has been found when tempering silica-alumina catalyst particles by the method herein described that a product catalyst is obtained which is highly active and selective for the conversion of hydrocarbons and which is desirably resistant to the deactivating influence of temperature and steam partial pressures encountered in, for example, a catalytic cracking system.

In accordance with the method of this invention, catalyst particles of a fluidizable particle size and in a relatively dense fluid bed condition are caused to move through an indirectly heated preheating zone under conditions to heat the catalyst particles to ever increasing temperature in the direction of particle flow. This heating is effected initially in a moisture free atmosphere and then in a substantially oxygen free steam rich atmosphere when the temperature of the particles is above a temperature at which steam condensation will take place. Under these conditions the particles are heated to a temperature not substantially above about 1400° F. for a period of time in the range of from about 1 to about 4 hours and thereafter discharged into a heat soaking zone wherein the particles are retained in a relatively dense phase condition at a temperature not substantially above about 1500° F. for a period of time not substantially less than about 1 hour and generally not substantially more than about 24 hours but preferably from about 4 to about 10 hours. The particles thus subjected to steam and thermal tempering conditions are thereafter removed from the heat soak zone for cooling to a desired low temperature of about 200° F. and suitable for handling thereby producing the catalyst particles desired.

More specifically in the method and system of this invention a relatively thin or shallow dense fluid bed of catalyst particles is caused to move generally horizontally through an indirectly heated preheat zone wherein the particles of catalyst are initially fluidized with a gasiform material such as air, flue gas, nitrogen or other suitable gas of low moisture content until the particles of catalyst reach a temperature in excess of steam condensation temperatures. Thereafter the catalyst particles are fluidized with steam or a gas stream comprising a major portion of steam most usually greater than 80 or 90% steam while being heated to an elevated temperature of about 1400° F. It is preferred to use a gas stream of at least about 90 or 100% steam since under steaming conditions of at least about 1400° F. the steaming and soaking time may be significantly reduced when using 100% steam.

In the system and means of this invention, the preheat zone or chamber is a generally elongated horizontal preheat chamber through which the bed of particles move horizontally over a foraminous plate or distributor grid through which the fluidizing gasiform material is passed. Positioned above the upper level of the dense fluid bed of catalyst particles and spaced apart therefrom a desired distance is placed, a heat radiating plate member forming the bottom of a plenum chamber running substantially the entire length of the horizontal preheat chamber. The plenum chamber is heated by a plurality of direct fired burners spaced throughout the plenum chamber having their flame front above or adjacent to the radiating plate member in a manner which will provide the desired amount of radiated heat to heat the fluid bed of particles therebelow to the desired elevated temperature.

Therefore, in the system and apparatus of this invention the catalyst particles to be tempered are introduced to one end of the preheat chamber by a standpipe, screw conveyor or other suitable arrangement for flow through the preheat zone generally horizontally in a relatively dense fluid bed condition of a height limited to obtain desired transfer of radiant heat. The height of the bed maintained in the preheat chamber and passing over the foraminous plate is controlled by a vertically adjustable weir at the discharge end thereof and opposite the catalyst particle inlet to the preheat zone. The particles heated to the desired elevated temperature pass over the weir for flow to a heat soaking zone or chamber herein discussed.

In the apparatus herein described, provision is made for separately controlling the amount of fluidizing gas passing upwardly through various portions of the grid cross-section by providing a plurality of gas distributor chambers beneath the grid throughout the length thereof. By this arrangement the initial portion of the fluid bed of catalyst particles adjacent their inlet to the preheat zzone may be contacted first with a steam free fluidizing gas until the bed of particles has reached a desired elevated temperature above a steam condensation temperature in what may be referred to as the heat-up zone before contact with a gasiform material predominately steam in the steam treating zone.

Furthermore, the superficial velocity of the fluidizing gas employed to maintain the relatively dense fluid bed of catalyst particles is of a relatively low magnitude generally less than about 1 and most usually less than about 0.5 ft./sec. Provisions are made for collecting and removing the fluidizing gas from above the bed of particles for passage through suitable solid particle filtering or recovery means such as cyclone separators, electrostatic precipitations, bag filters or combinations thereof. Also, provisions are made for removing combustion product gases or flue gases from the penum chamber.

As mentioned above, the catalyst particles are heated to an elevated temperature above about 1200° F. and more usually above about 1400° F. and as high as about 1500° F. in a predominately steam atmosphere of at least about 90% for a desired length of time in a range of from about 1 to about 10 hours. When using 100% steam at about 1500° F., steaming of the silica-alumina particles may be accomplished at a time in the range of 1 to about 3 hours. Thereafter the steamed catalyst is passed to a holding chamber or heat soaking chamber maintained under atmospheric or elevated pressure conditions up to 10 and as high as 15 p.s.i.g. wherein the particles are maintained at a heat soaking temperature condition above about 1400° F. in a steam rich atmosphere. Although only two heat soaking chambers are shown, it is to be understood that more than two chambers may be provided for this purpose so that the complete operation may be regarded as a continuous operation and one which will permit filling a catalyst holding chamber, maintaining the holding chamber when filled under heat soaking conditions, cooling of the particles after completion of the heat soaking time and emptying of the holding chamber. Accordingly, the holding chambers may be maintained in a relatively dense fluid condition and are provided in sufficient number to permit the above operating cycle and substantially continuous operation of the steam treating-heating section.

Cooling of the heat treated silica-alumina particulate material may be accomplished any number of ways through direct and indirect heat exchange means. That is, it has been specifically shown and described herein; cooling the heat treated material by indirect heat exchange means which may be embedded in the dense bed of particulate material either with or without the annular heat exchange chamber forming the vertical walls of the chamber. Of course, other well known and suitable arrangements of indirect heat exchange means may also be employed. It is further contemplated, however, cooling the particulate material directly with a cool gasiform material. That is, the particulate material may be transferred from the heat soaking chamber by a cooling gas which also acts as a fluidizing gas to transport the particles in a fluidized condition to a suitable collecting chamber.

A surprising result of the study herein present is the realization and discovery that steam treatment prior to thermal treatment markedly improves the thermal stability of silica-alumina type catalyst, and furthermore, either with or without crystalline aluminosilicates of a zeolitic structure which has been catalytically activated by combining one or more polyvalent metals therewith such as rare earth metals. Accordingly, the catalytic materials of copending application Ser. No. 42,284, filed July 12, 1960 (now Patent No. 3,140,249). may be treated by the method and in the system herein described.

In a normal commercial operation, for example, cracking catalysts are heated to high temperatures during the air regeneration cycle. Several procedures have been developed by the industry to check the relative thermal stability of commercial and experimental cracking catalysts. One procedure involves heating the catalysts at various temperatures prior to determining physical properties like density, pore volume, surface area and average pore size. The temperature study effected in accordance with this invention was carried out using a fluidized bed of particles in dry air for 3 hours at 1250° F., 1550° F., 1650° F., 1700° F., 1725° F., and 1750° F. Both the unsteamed and steam tempered silica-alumina fluid catalyst were treated in this same manner. The less the change in the physical properties over the critical temperature range of 1600° F. to 1750° F. the more stable the catalyst would be in commercial operation. The results plotted in FIGURES 1 and 2 show that the physical properties of the steam-tempered silica-alumina cracking catalyst change at a much slower rate than the regular commercial silica-alumina catalyst in the normal dried state.

Figure 2:
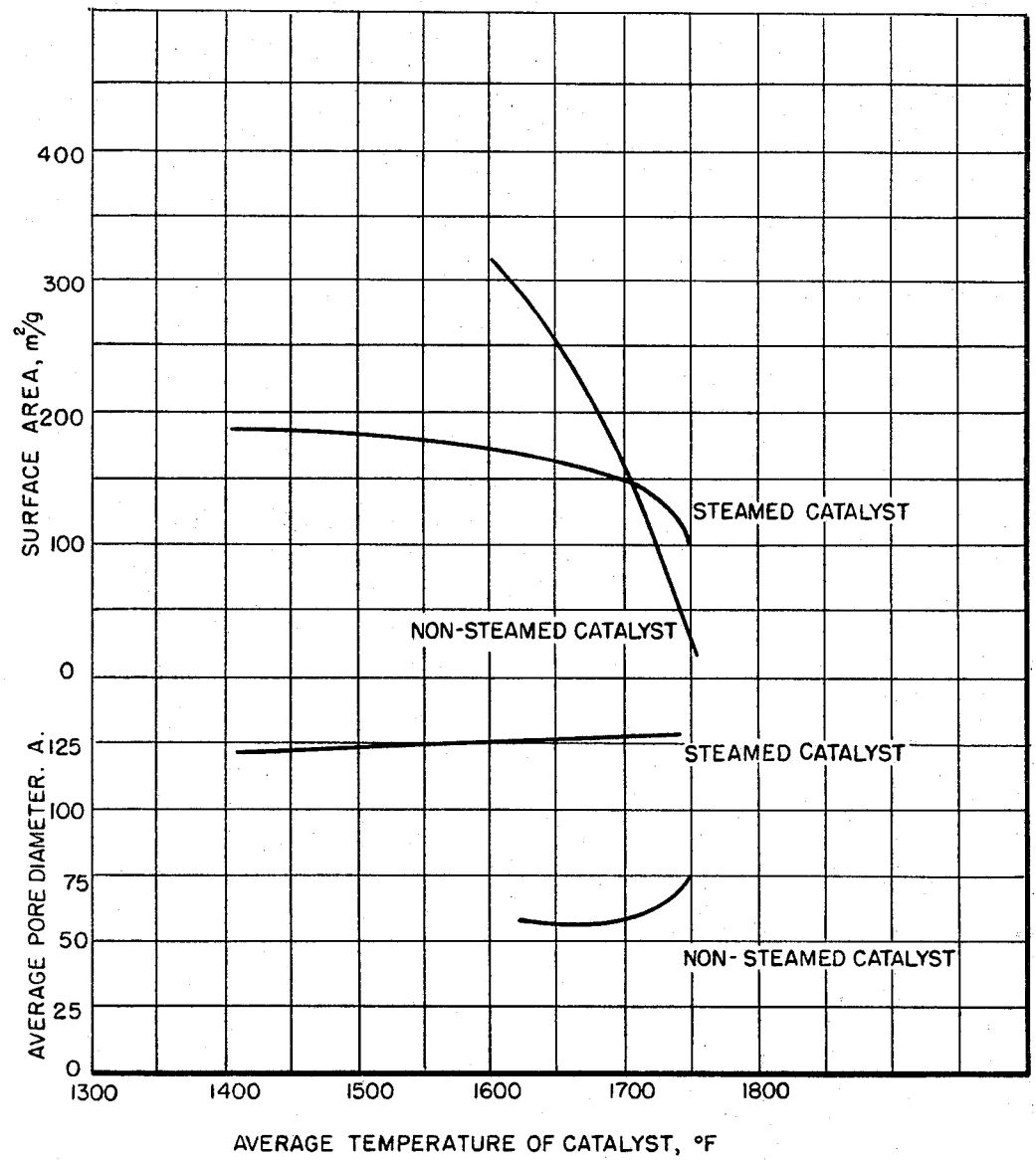

The results summarized below and those presented in FIGURES 1 and 2 show that change in physical properties over the 1600–1750° F. temperature range for the steam-tempered catalyst is about one-half that for the unsteamed catalyst.

Commercial Fluid Silica-Alumina (13% $Al_2O_3$) Catalyst

|  | State Prior to Thermal Treat | |
| --- | --- | --- |
|  | Dried | Steam-Tempered 4 Hr. at 1,400° F. Atm. Press., 100% Steam |
| Thermal Treat, 3 Hr. at Temp. ° F. in Air | 1,600   1,750 | 1,600   1,750 |
| Surface Area, m.²/g | 315   30 | 170   100 |
| Pore Volume, cc./g | .45   .07 | .45   .31 |
| Density, g./cc | .72   1.25 | .67   .88 |
| Percent Change in Physical Properties: |  |  |
| Surface Area | −90 | −40 |
| Pore Volume | −87 | −31 |
| Density | +74 | +31 |

Over a temperature range of 1500 to about 1700° F., the steam tempered catalyst compared with the unsteamed catalyst also showed substantially less change in (1) pore volume, (2) density, and (3) surface area. This is significant since the less the change in pore volume, surface area and catalyst particle density the more thermally stable the catalyst. Therefore, the following table shows for a silica-alumina catalyst, the relative improved stability of the catalyst when steamed in accordance with the method herein described by virtue of the small changes effected in the catalyst particle physical characteristics when heated at a temperature of 1500° F. and 1700° F.

TABLE

| Temp. | Steamed Catalyst | | | Non-Steamed Catalyst | | |
| --- | --- | --- | --- | --- | --- | --- |
|  | Surface Area | Pore Vol. | Density | Surface Area | Pore Vol. | Density |
| 1,500° F | 180 | .58 | .65 | 400 | .54 | .65 |
| 1,700° F | 150 | .47 | .72 | 150 | .22 | .95 |
| Change | 30 | .11 | .07 | 250 | .32 | .30 |

The above table shows for a calcined or heat treated catalyst that a greater change occurred in the physical characteristics of the unsteamed catalyst than the steamed catalyst showing it to be considerably less thermally stable than the steamed catalyst.

The marked improvement in the stability of the steamed catalyst over the unsteamed catalyst prepared in accordance with this invention is more dramatically shown in FIGURES 1 and 2 presented herewith. That is, FIGURE 1 presents curves which show the effect of temperature on pore volume and density of steamed and non-steamed catalyst particles. FIGURE 2, on the other hand, presents curves which show the effect of temperature on surface area and pore size of steamed and non-steamed catalyst particles.

Referring now to FIGURE 1, the upper curves show that there is a significant difference in the change of particle density between a steamed and non-steamed catalyst heated to temperature in excess of about 1500° F. That is, although the density of a catalyst particle increases with increasing temperatures, the increase or change for the steamed catalyst is significantly less than for the non-steamed catalyst. The bottom curve of FIGURE 1, on the other hand, shows a corresponding decrease in pore volume, with the steamed catalyst showing a significantly less reduction in pore volume than that encountered with the non-steam catalyst particles.

FIGURE 2, on the other hand, shows in the upper curve a very dramatic reduction in catalyst particle surface area for the non-steamed catalyst particles over the that encountered with the steam catalyst when heated to different elevated temperatures. The lower curve of FIGURE 2 shows that the average pore diameter of the steamed catalyst is substantially greater than the non-steamed catalyst and that any change in pore diameter due to change in temperature is significantly less than that encountered with the non-steamed catalyst.

It is evident from the plot of data presented in FIGURES 1 and 2 that there is a marked improvement in the thermal stability of the steamed catalyst over the non-steamed catalyst.

Figure 3:
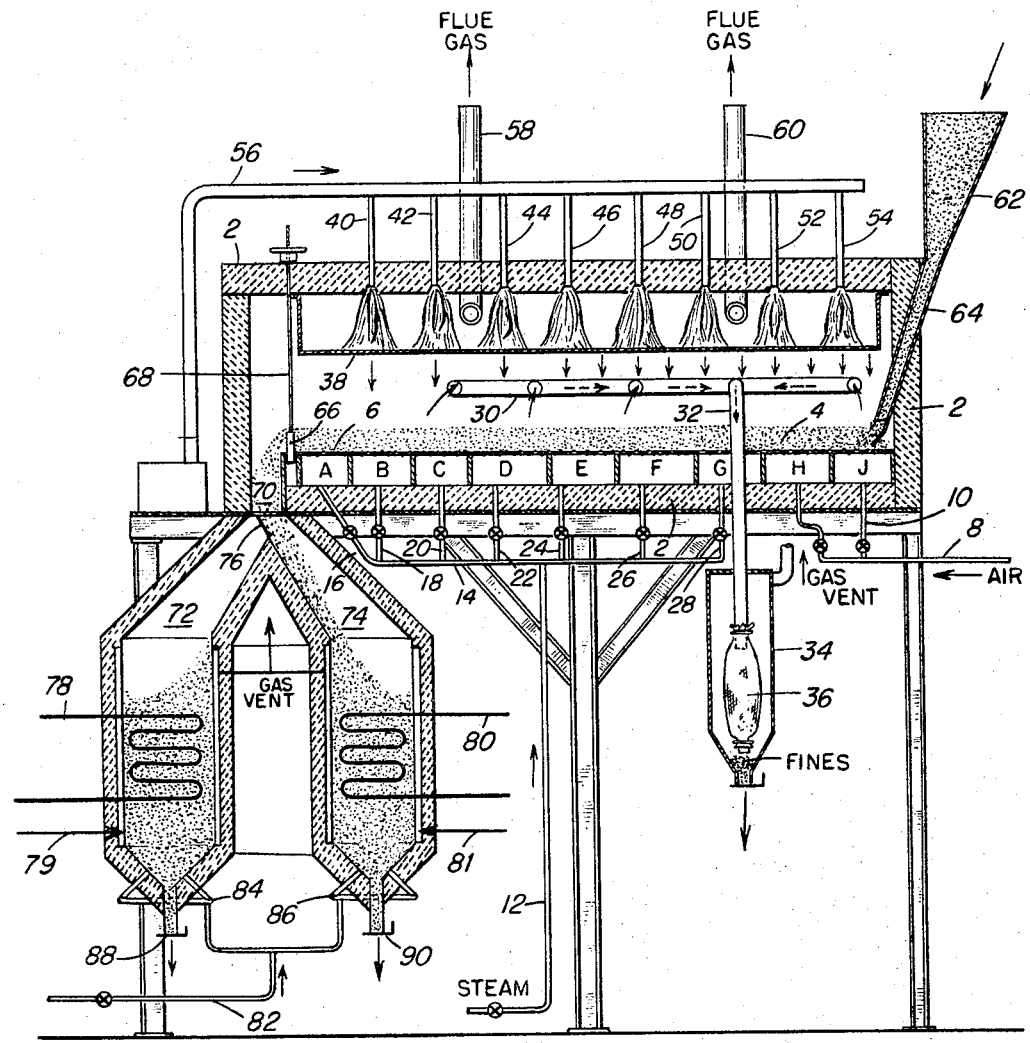

Having thus provided a general description of the improved method of this invention and presented data in support thereof, reference is now had to the system and apparatus of FIGURE 3 which presents diagrammatically one arrangement of means for practicing and obtaining the improvement herein described.

In FIGURE 3 is shown a treating chamber defined by walls 2 which is an elongated generally horizontal chamber through which a relatively dense fluid bed of solid particle material 4 moves horizontally through and over a perforated gasiform distributing member 6. The space beneath the grid 6 and between the bottom of the chamber wall 2 is separated by a plurality of spaced apart non-porous vertical baffle means to provide a plurality of gasiform distributor chambers A, B, C, D, E, F, G, H and J. More or less distributor chambers may be employed as desired to facilitate maintaining a relatively uniform bed depth passing across grid 6. In the arrangement shown, chambers H and J are provided for introducing a substantially steam free gasiform material during heating of the particle material above a steam condensation temperature. Of course, more distributor chambers may be used for this purpose, if required. Air or other suitable fluidizing gas is introduced to chambers H and J by conduit 8 and branched conduit 10. Distributor chambers A through G are supplied with fluidizing steam introduced through conduit 12 and connected to manifold 14 which supplies valved branch conduits 16, 18, 20, 22, 24, 26 and 28 communicating respectively with chambers A through G as shown. By this arrangement, independent control of the volume of fluidizing gas passed to any one chamber is provided. The fluidizing gas passed to each distributor chamber moves upwardly through the distributor grid and maintains a shallow bed of particle material thereabove of a fluidizable particle size in a relatively dense fluid bed condition. Fluidizing gas recovered from above the bed of solid is collected by any suitable method or means for removal from the chamber and recovery of entrained fines carried along with the fluidizing gas. In the arrangement shown, a collector manifold 30 provided with a sufficient number of open gasiform inlets thereto is connected with a withdrawal conduit 32 for passing recovered fluidizing gas to a chamber 34 provided with suitable particle recovery means such as a bag filter 36 shown.

Provisions are made for removing recovered solid fines from the bag filter and chamber 34.

A heat radiating plenum chamber formed by baffle member 38 spaced beneath the roof wall 2 of the chamber and a relatively short distance above the upper level of the fluid bed of solids is heated with a plurality of fired burners represented by burners 40, 42, 44, 46, 48, 50, 52 and 54. The burners are provided with independent gas flow control valves not shown in the conduits connecting the burners with a burner fuel distributor manifold 56. Burner flue gas removal conduits 58 and 60 are suitably connected to the plenum chamber to remove gaseous combustion products therefrom.

The solids to be calcined and heat treated are introduced to the chamber from hopper 62 for flow by a standpipe 64 or other suitable means onto the rigid 6. Thereafter the solids move as discussed above generally horizontally and as a relatively dense fluid bed of solids across the distributor plate to the opposite end of the treating chamber. In order to control the height of the bed of solids retained on the grid, a vertically adjustable weir plate or dam plate 66 connected to a height adjustment rod 68 is provided at the end of the heat treating chamber from which the steamed solids are withdrawn. The steam treated solids pass over the top of the weir into a passageway 70 connected with the heat soaking zones described below.

In the system and apparatus of FIGURE 3, only two heat soaking zones are shown as a matter of convenience. It is to be understood as discussed above, however, that sufficient heat soaking chambers are provided to permit cyclic use through filling, heat soaking, cooling and emptying while providing a substantially continous operation in the preliminary steam treating-heating step.

Accordingly, in the arrangement shown, two chambers 72 and 74 are provided to which steam treated particles may be directed as desired by valve 76. That is, steamed particles falling through passageway 70 are directed by a valve 76 to the soaking chamber being filled with particle material while another chamber in the cycle is undergoing either heat soaking as shown in chamber 72, or cooling and emptying in chambers not shown. The chambers are provided with suitable heating and cooling coils 78 and 80 so that a heating fluid may be circulated through the coil when desired during the heat soaking period and a cooling fluid during the cooling off period. A heating or cooling fluid introduced by conduits 79 and 81 may also be circulated about the shells of chamber 72 and 74 during the heat soaking and/or cooling cycles. Provision is also made by conduit 82 connected to branched conduits supplying manifold 84 and 86 for introducing a fluidizing gas such as steam or other suitable gaseous material into the chamber during cooling and/or emptying.

Under some circumstances and in accordance with an embodiment of this invention, it is contemplated removing the solids without substantial cooling after the heat soaking period and cooling and solid in a transfer conduit with cooling gas during transfer to a suitable storage hopper. Accordingly, suitable valved withdrawal conduits 88 and 90 are provided for withdrawing solid particle material from the bottom of soaking chambers 72 and 74.

Having thus provided a general description of this invention and presented specific examples related thereto, it is apparent that many obvious modifications may be made thereto without departing from the spirit thereof.

We claim:
1. In the method for tempering catalyst particles with steam followed by thermal treatment at a temperature between 1200° F. and about 1500° F., the improvement which comprises
    passing catalyst particles of a fluidizable particle size in a relatively shallow dense fluid bed condition through an indirectly heated contact zone under conditions to heat the particles to ever increasing temperature in the direction of particle flow, contacting the particles in the contact zone first in a substantially moisture-free atmosphere until the temperature of the particles is above the condensation temperature of steam and then in a substantially oxygen-free, steam-rich atmosphere until the temperature of said particles is at least about 1200° F. to about 1400° F., said indirect heating being for a period of time from about 1 to about 4 hours.

2. The method of claim 1 wherein the steam-rich atmosphere contains at least 90% steam.

3. The method of claim 1 wherein said catalyst particles comprise silica-alumina particles.

4. The method of claim 1 wherein the indirectly heated contact zone is a radiant heating zone.

5. The method of claim 1 wherein said catalyst particles are passed generally horizontally through said indirectly heated contact zone.

6. The method of claim 1 wherein the substantially oxygen-free, steam-rich medium is passed upwardly through said particles in said indirectly heated contact zone under conditions to maintain said dense fluid bed of catalyst particles.

References Cited

UNITED STATES PATENTS

| | | | |
|---|---|---|---|
| 2,897,246 | 7/1959 | Keizer et al. | 252—455 X |
| 2,914,486 | 11/1959 | Schwartz | 252—455 |
| 2,982,719 | 5/1961 | Gilbert et al. | 252—455 X |
| 3,257,310 | 6/1966 | Plank et al. | 208—120 |

OTHER REFERENCES

"Steam Aging of Cracking Catalysts," H. A. Shabaker, vol. 3, No. 1, May 1948, 8 pages.

DANIEL E. WYMAN, *Primary Examiner.*

CARL F. DEES, *Assistant Examiner.*